Aug. 2, 1927.
A. R. KELLER
COUPLING DEVICE
Filed July 22, 1925
1,637,944
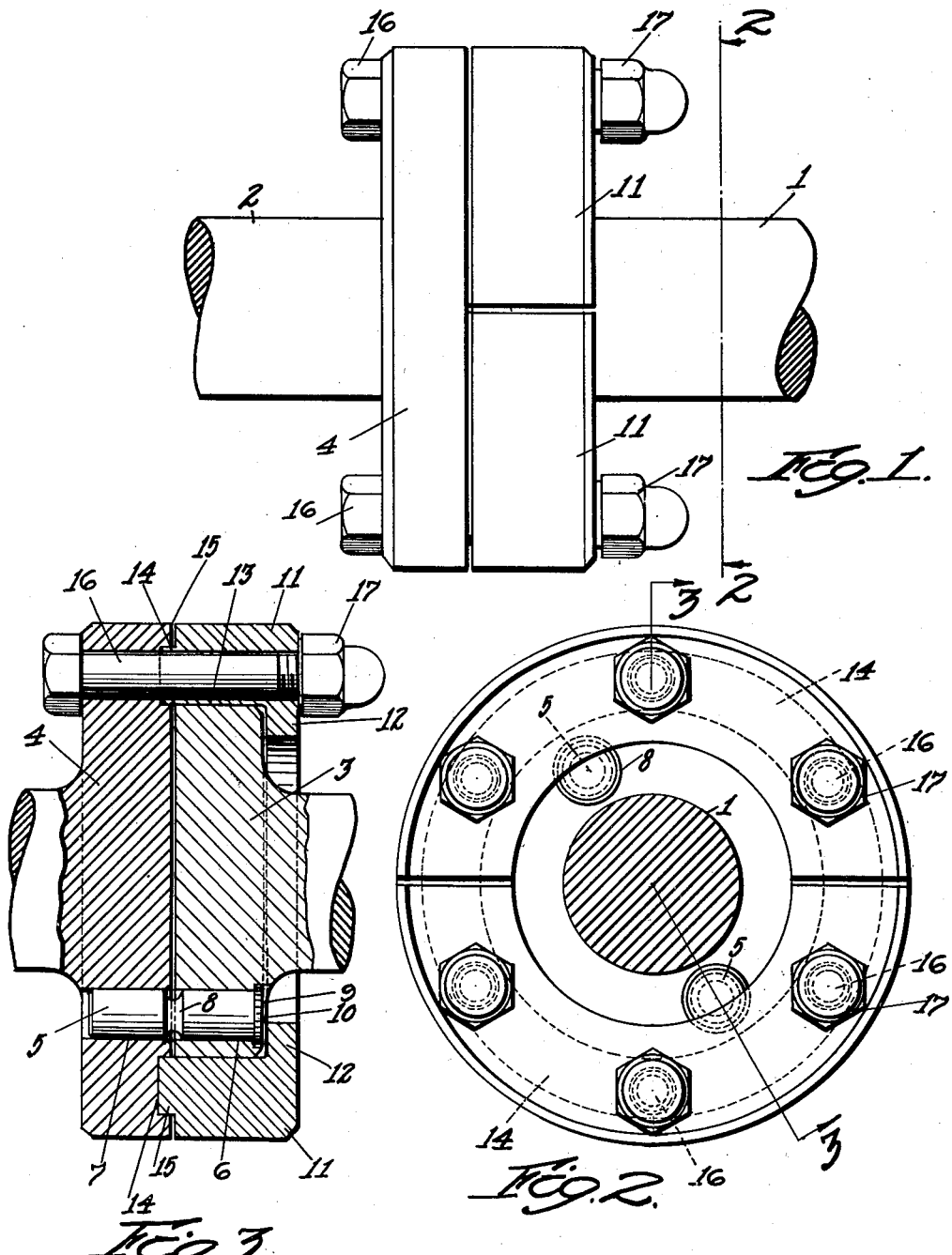
Inventor:
Alfred R. Keller
by Attorney
Geo. H. Kennedy Jr.

Patented Aug. 2, 1927.

1,637,944

UNITED STATES PATENT OFFICE.

ALFRED R. KELLER, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

COUPLING DEVICE.

Application filed July 22, 1925. Serial No. 45,332.

The present invention relates to coupling devices, and more particularly involves couplings of the safety type, wherein provision is made for automatically breaking the driving connection between the coupled shaft sections or other coupled parts when the load becomes excessive, thereby to avoid the damage which might result in other parts of the same machinery from the transmission of power commensurate with said excess load. The construction of my improved safety coupling device is such that when the automatic breakage occurs, the alinement between the previously coupled parts or shaft sections is nevertheless positively maintained; furthermore, no end thrust is set up as a result of such breakage and, in addition, the parts designed to give way under the conditions named are absolutely prevented from coming out while the coupling is still rotating, thus insuring the protection of persons and other machinery near by from being struck by flying parts. The above and other objects are attained by the device hereinafter described and illustrated in the accompanying drawings, in which—

Fig. 1 is a view in side elevation of my improved safety coupling.

Fig. 2 is an end elevation thereof, as viewed from the line 2—2 of Fig. 1.

Fig. 3 is a sectional view on the line 3—3 of Fig. 2.

Like reference characters refer to like parts in the different figures.

My improved safety coupling is here shown as applied to the connection of alined shaft sections 1 and 2, the former preferably constituting the driving section and the latter the driven section. As shown in Fig. 3, the shaft sections 1 and 2 are provided with opposing flanges 3 and 4, respectively, the flange 3 being of lesser diameter than the flange 4, for a purpose to be hereinafter described. The driving connection between the flanges 3 and 4, whereby the rotation of the section 1 is imparted to the section 2, is constituted, as here shown, by a pair of diametrically opposite pins 5, 5, which are entered in holes 6, 6 of the flange 3 and which project into corresponding alined holes 7, 7 of the flange 4. These pins 5, 5 are here shown as two in number, but obviously any number of such pins may be provided, as determined by the cross-sectional area for the driving connection between the flanges; as shown in Fig. 3, each pin 5, as indicated at 8, has a breakable portion of reduced cross-sectional area this portion being maintained in the meeting plane of the flanges 3 and 4 when the pin is in place, with its head 9 occupying a countersunk recess 10 at the outer end of the hole 6.

This construction prevents endwise displacement of the pins 5, 5 in one direction, and endwise displacement in the other direction is prevented by a pair of cover plates 11, 11, having inturned flanges 12, 12 which overlap the heads 9, 9 of the pins 5, 5. These cover plates 11, 11 are semi-annular in form, the two of them providing a structure which completely surrounds the outer periphery of the flange 3, and which provides an internal surface 13 having a running fit with said flange. The cover plates 11, 11 are secured to and carried by the flange 4; to this end, the face of flange 4 is preferably formed with an annular groove 14 adapted to receive correspondingly shaped projections 15, 15 on the cover plates 11, 11, the parts being detachably clamped together by through bolts 16, 16 provided with suitable nuts 17, 17.

In operation, the rotation of shaft section 1 is transmitted to the shaft section 2 through the pins 5, 5, with the entire coupling assembly rotating as a unit. When the load increases beyond a predetermined safe limit, the pins 5, 5 will shear at their reduced sections 8, 8, and thus the transmission of power to the shaft section 2 will be discontinued. However, this automatic breakage of the coupling takes place without any disturbance whatsoever of the established alinement of the shaft sections 1 and 2, inasmuch as the internal surfaces 13, 13 of the cover plates 11, 11 maintain surrounding relation to the flange 3, thus preventing any deflection of either shaft section. Furthermore, neither shaft section, notwithstanding the breakage of the driving connection, is permitted to shift axially since the flanges 12, 12 of the cover plates 11, 11 continue to hold the flanges 3 and 4 in substantial contact at their opposing faces. Finally, in spite of the fact that the shaft section 1 and flange 3 continue to rotate rapidly, after breakage of the pins 5, 5, there is no possibility of the broken pins being thrown out centrifugally or otherwise to endanger nearby persons or other machinery; the flange portions 12, 12 of cover plates 11, 11 prevent any outward movement of the broken pins. To reestablish the driving connection between the parts of the coupling, it is only necessary to remove the detachable cover plates 11, 11 and to substitute new pins 5, 5 for the broken ones.

I claim,

1. In a safety coupling device of the class described, alined shaft sections provided with end flanges of different diameter in abutting relation, driving pins extending through said flanges, and a member carried by the larger of said flanges for inclosing the smaller flange and for holding said pins against longitudinal movement.

2. In a safety coupling device of the class described, alined shaft sections having flanges in abutting relation, driving pins extending through said flanges with reduced portions in the meeting plane of the flanges and with their heads received in one of the flanges, and a member carried by the other of said flanges for engaging the heads of the pins to prevent their longitudinal movement.

3. In a safety coupling device of the class described, alined rotatable members, abutting flanges carried by said members, a driving pin carried by one flange and extending into the other flange, and annular means carried by the latter flange and extending over the head of said driving pin, whereby to maintain the members in axial alinement in case of breakage of said pin and to retain said pin in driving position.

4. In a safety coupling device of the class described, alined rotatable members, a flange carried by one of said members, a smaller flange carried by the other of said members, said flanges being in abutting relation, a groove in the larger of said flanges, a driving pin extending between said flanges, and annular means positioned in said larger flange by means of said groove and bolted thereto, said annular means extending over the head of the said driving pin in said smaller flange, whereby to maintain the members in axial alinement in case of breakage of said pin and to retain said pin in driving position.

5. In a safety coupling device of the class described, alined driving and driven shaft sections provided with end flanges in abutting relation, one or more driving pins extending between said flanges, and a pair of semi-annular members fastened to one of said flanges and extending over the heads of said driving pins, whereby to maintain alinement of said shafts, to hold said pins against longitudinal movement, and provide for easy disassemblage of said coupling upon breakage of a pin.

6. In a safety coupling device of the class described, alined shaft sections provided with end flanges of different diameter in abutting relation, alined holes through said flanges, driving pins located in said alined holes, said pins having heads fitting in recesses in said smaller flange, a pair of semi-annular members fastened to said larger flange and embracing said smaller flange, and inturned flanges on said semi-annular members extending over the heads of said pins, whereby to prevent relative displacement of said shafts upon breakage of said pins, to hold said broken pins from flying out and to facilitate ready disassemblage of the parts.

Dated this second day of July, 1925.

ALFRED R. KELLER.